(12) United States Patent
Sakamoto (10) Patent No.: US 7,246,946 B2
(45) Date of Patent: Jul. 24, 2007

(54) ROLLING BEARING UNIT FOR SUPPORTING WHEEL

(75) Inventor: Junshi Sakamoto, Fujisawa (JP)

(73) Assignee: NSK Ltd., Tokyo (JP)

( * ) Notice: Subject to any disclaimer, the term of this patent is extended or adjusted under 35 U.S.C. 154(b) by 25 days.

(21) Appl. No.: 10/504,172

(22) PCT Filed: Feb. 19, 2003

(86) PCT No.: PCT/JP03/01758

§ 371 (c)(1),
(2), (4) Date: Nov. 12, 2004

(87) PCT Pub. No.: WO03/071146

PCT Pub. Date: Aug. 28, 2003

(65) Prior Publication Data

US 2005/0157968 A1    Jul. 21, 2005

(30) Foreign Application Priority Data

Feb. 19, 2002    (JP)    ............................. 2002-042046

(51) Int. Cl.
*F16C 33/78*    (2006.01)

(52) U.S. Cl. ...................................................... 384/482
(58) Field of Classification Search ................ 384/482, 384/486, 484, 537, 544
See application file for complete search history.

(56) References Cited

FOREIGN PATENT DOCUMENTS

| JP | 10-252762 | 9/1998 |
|---|---|---|
| JP | 11-023598 | 1/1999 |
| JP | 2001-221243 | 8/2001 |

OTHER PUBLICATIONS

International Search Report dated Jun. 3, 2003.

*Primary Examiner*—Lenard A. Footland
(74) *Attorney, Agent, or Firm*—Crowell & Moring LLP (57) ABSTRACT

Rotation torque of the hub rotating together with the road wheel is reduced to improve the driving performance of the vehicle such as acceleration performance, fuel consumption.

The opening at both ends of the space where balls 14, 14 are provided is covered by seal rings 16c, 16d each having two or three seal lips. The whole rotation torque of the both seal rings 16c, 16d based on the friction between the seal lips and the mating surface is reglated between 0.06 N·m and 0.4 N·m.

2 Claims, 7 Drawing Sheets

ROLLING BEARING UNIT FOR SUPPORTING WHEEL

FIELD OF THE INVENTION

This invention relates to the improvement of a rolling-bearing unit for wheel support for supporting a wheel of an automobile to the suspension apparatus such that it rotates freely.

BACKGROUND OF THE INVENTION

Figure 10:
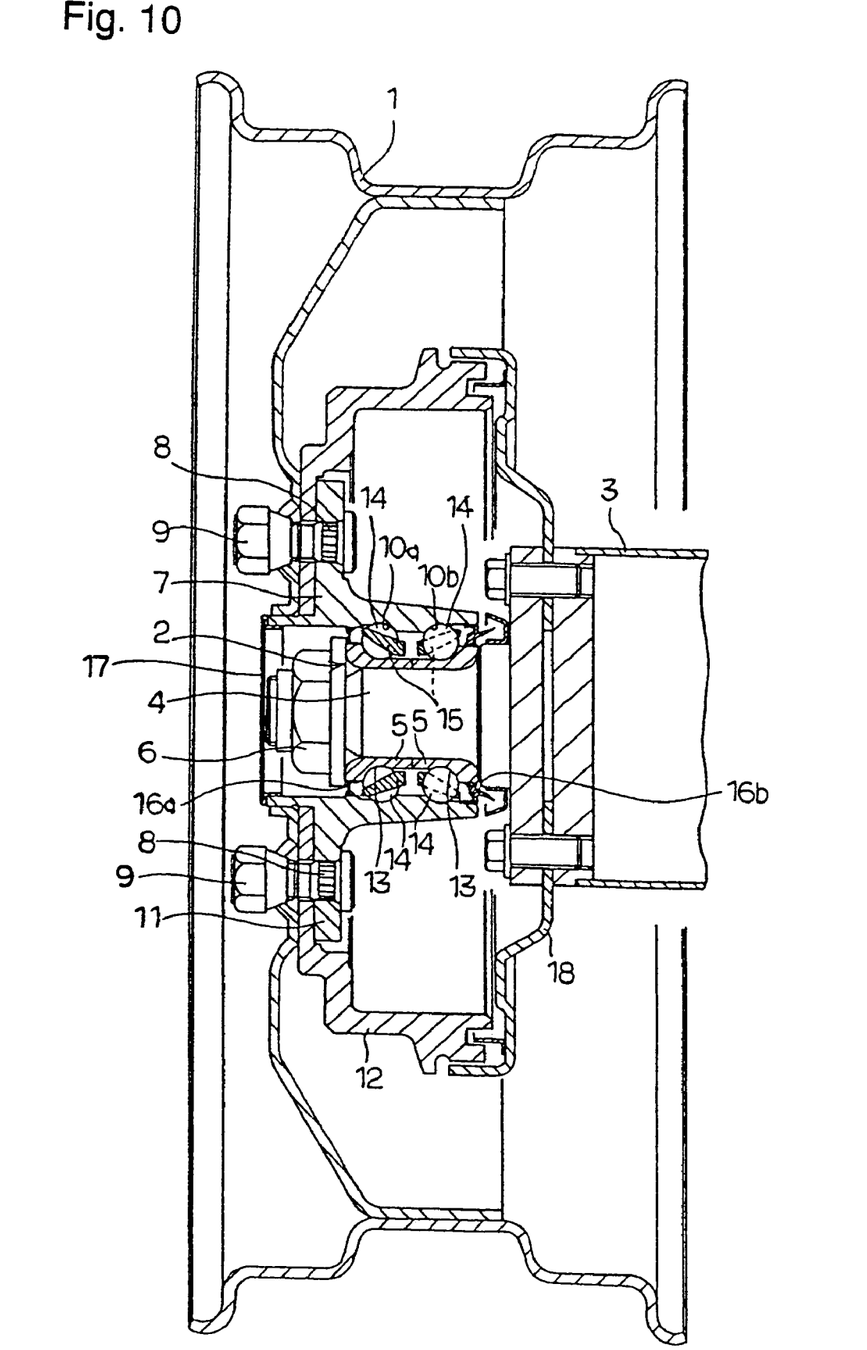
FIG. 10 is a cross-sectional drawing showing the state of a first example of a conventional roller-bearing unit for wheel support that is installed in the suspension apparatus.
Figure 11:
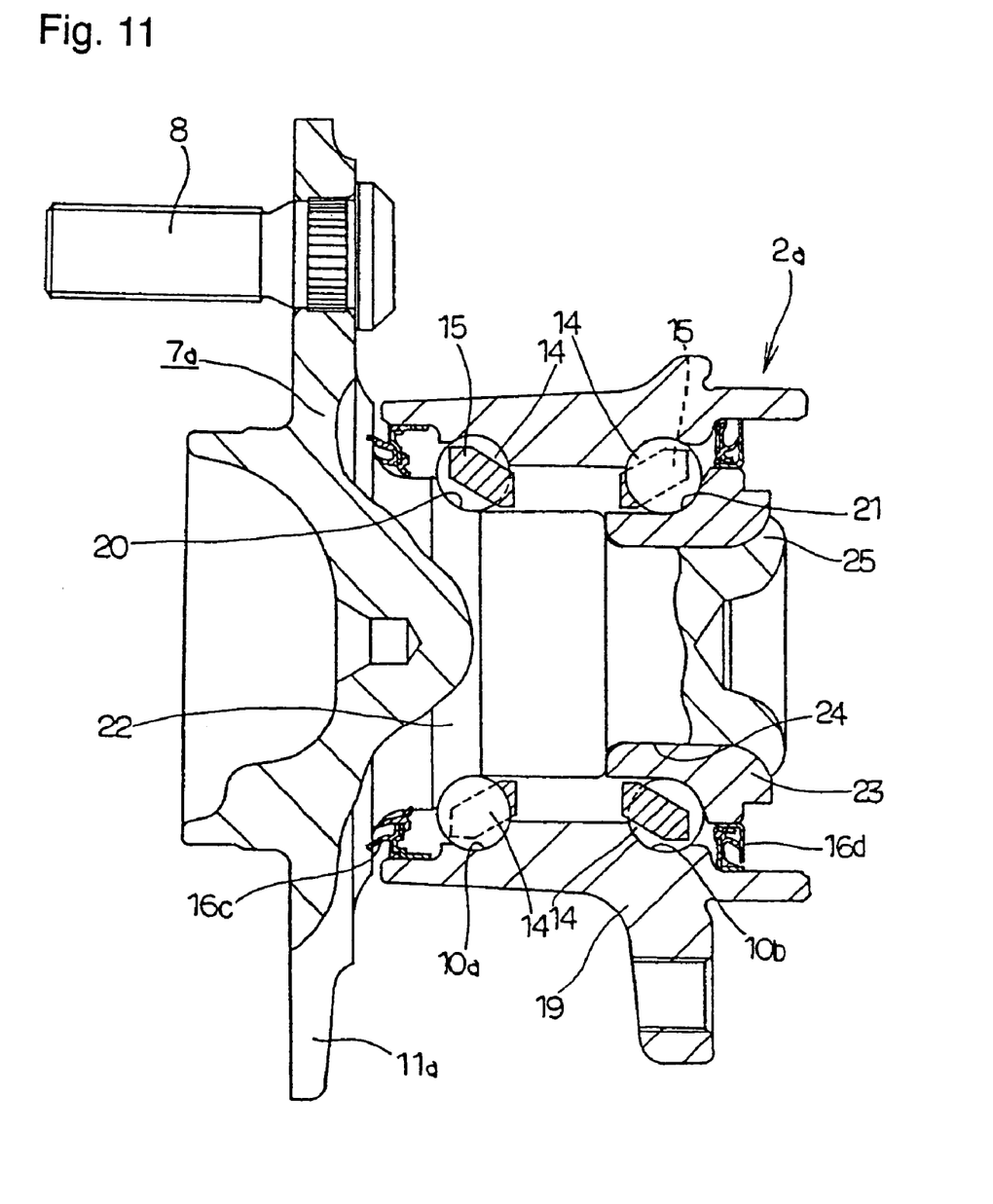
FIG. 11 is a cross-sectional drawing showing the state of a second example of a conventional roller-bearing unit for wheel support that is installed in the suspension apparatus.xxs

Construction of a rolling-bearing unit for wheel support, as disclosed in Japanese patent publication No. Tokukai 2001-221243, is shown in FIGS. 10 and 11. First, a first example of this construction as shown in FIG. 10 will be explained. A wheel rim 1 is supported by the rolling-bearing unit 2 for wheel support on the end section of the wheel axle 3 of the suspension apparatus such that it can rotate freely. In other words, the inner races 5, 5 of the rolling-bearing unit 2 for wheel support are stationary races and fit around the outer surface of the support shaft 4 that is fastened to the end of the wheel axle 3, and are fastened by a nut 6. On the other hand, the wheel rim 1 is connected and fastened to the hub 7 of the rolling-bearing unit 2 for wheel support, which is a rotating race, by a plurality of studs 8, 8 and nuts 9, 9.

A double row of outer-race tracks 10a, 10b, which are both rotating race tracks, are formed around the inner peripheral surface of the hub 7, and an installation flange 11 is formed around the outer peripheral surface of the hub 7. The wheel rim 1, together with the drum 12 of the braking apparatus, is connected to and fastened to the surface on one side of the installation flange 11 (outside surface in the example in the figure) by the studs 8, 8 and nuts 9, 9.

A plurality of rolling bodies or balls 14, 14 are located between the outer-race tracks 10a, 10b and the inner-race tracks 13, 13, which are stationary race tracks and are formed around the outer peripheral surface of the inner races 5, 5, and are held by retainers 15, 15 such that they can roll freely. By combining all of these components in this way, a back-to-back double-row angular ball bearing is formed, and it supports the hub 7 around the inner races 5, 5 such that it rotates freely, and supports radial load and thrust loads. Seal rings 16a, 16b are located between the inner peripheral surfaces on both ends of the hub 7 and the outer peripheral surface of the end sections of the inner races 5, 5, and they seal off the space where the balls 14, 14 are located from the outside space. Furthermore, a cap 17 covers the opening sections on the outside end of the hub 7 (throughout this disclosure, the outside in the width direction when the bearing is installed in the vehicle is referred to as the outside in the axial direction, and similarly, the center in the width direction is referred to as the inside).

As shown in FIG. 10, when using the rolling-bearing unit 2 for wheel support described above, the support shaft 4, around which the inner races 5, 5 are fastened, is fastened to the wheel axle 3, and the wheel rim 1, combined with the tire (not shown in the figure), and the drum 12 are fastened to the installation flange 11 of the hub 7. Also, of these, the drum 12, combined with the wheel cylinder and shoes (not shown in the figure) that are supported by the backing plate that is fastened to the end of the wheel axle 3, form a drum brake for braking. During braking, a pair of shoes that are located on the inner-diameter side of the drum 12 press against the inner surface of the drum 12.

Next, a second example of prior construction as shown in FIG. 11 is explained. In the case of this rolling-bearing unit 2a for wheel support, the hub 7a, which is the rotating race, is supported on the inner-diameter side of the outer race 19, which is a stationary race, by a plurality of rolling bodies or balls 14, 14 such that it rotates freely. In order for this, a double row of outer-race tracks 10a, 10b, which are stationary race tracks, are formed around the inner peripheral surface of the outer race 19, and a first and second inner race track 20, 21, which are rotating race tracks, are formed around the outer peripheral surface of the hub 7a. This hub 7a comprises a hub member 22 and inner race 23. Of these, an installation flange 11a for supporting the wheel is located on the outside end section of the outer peripheral surface of the hub member 22, and similarly, a first inner-race track 20 is formed in the middle section, and also similarly, a small-diameter section 24, which has a smaller diameter than the section where the first inner-race track 20 is formed, is formed in the middle section near the inside end of the hub 7a. Moreover, an inner race 23, around whose outer peripheral surface there is a second inner-race track 21 having an arc shaped cross section, fits around this small-diameter section 24. Furthermore, the surface on the inside end of the inner race 23 is held in place by a crimped section 25 that is formed by plastically deforming the inside end section of the hub member 22 outward in the radial direction, and this fastens this inner race 23 to the hub member 22. Also, seal rings 16c, 16d are located between the inner peripheral surface on both ends of the outer race 19, and the outer peripheral surface in the middle section of the hub 7a and the outer peripheral surface of the inside end of the inner race 23, and they seal off the space between the inner peripheral surface of the outer race 19 and the outer peripheral surface of the hub 7a where the balls 14, 14 are located from the outside space.

In the case of the rolling-bearing unit for wheel support described above, an increase in the torque (rotation resistance of the rolling-bearing unit for wheel support) required to rotate the hub 7 (or 7a) due to the existence of the seal rings 16a, 16b (or 16c, 16d), which seal off the openings on both ends of the internal space where the balls 14, 14 are located, is unavoidable. As a result, the driving performance, centered on the acceleration performance and fuel consumption of the automobile in which the rolling-bearing unit for wheel support is installed, becomes poor, so in the recent trend for more energy efficiency, improvement is desired.

Construction for reducing the resistance of the section of the sealing rings, and reducing the rotation torque of the rolling bearing has been considered in the past, such as the construction disclosed in Japanese Patent Publication No. Tokukai Hei 10-252762 in which the design of the interference of the seal lip is considered, and also the internal design such as the type of bearing, amount of pre-loading, shape of the components, contact angle or the radius of curvature of the race track surfaces, or also the type of grease used, and shape and material of the seal rings, and the like have all been considered. However, performing design work that correlates and properly regulates all of these elements, maintains the necessary seal performance and reduces the aforementioned rotation torque is troublesome. Therefore, simpler construction that is capable of reducing the rotation torque of a rolling-bearing unit for wheel support is desired.

The object of the rolling-bearing unit for wheel support of this invention is to solve the problems described above.

DISCLOSURE OF THE INVENTION

The rolling-bearing unit for wheel support of this invention comprises a stationary race, rotating race, a plurality of rolling bodies and a pair of seal rings as in the conventionally known rolling-bearing unit for wheel support described above.

Of these, the stationary race is supported by and fastened to the suspension apparatus when used.

Also, the rotating race supports and fastens to the road wheel when used.

Moreover, the rolling bodies are located between the surface of the stationary race tracks and the surface of the rotating race tracks that are formed on the surfaces of the stationary race and rotating race such that they face each other.

Furthermore, the pair of seal rings seals off the openings on both ends of the space between the opposing surfaces of the stationary race and rotating race where the rolling bodies are located.

Also, both seal rings have two to three seal lips made of elastic material.

Particularly, in the case of the rolling-bearing unit for wheel support of this invention, the rotation resistance of both seal rings due to the friction between the seal lips and the opposing surface is a total of 0.06 N·m to 0.4 N·m for both seal rings.

In the case of the rolling-bearing unit for wheel support of this invention constructed as described above, it is possible to maintain the necessary seal performance and to sufficiently reduce the rotation torque. In other words, since the total rotation resistance of the pair of seal rings is up to 0.4 N·m, it is possible to reduce the rotation torque of the entire rolling-bearing unit for wheel support.

On the other hand, since the total rotation resistance of the seal rings is kept at least 0.06 N·m, it is possible to maintain the necessary seal performance (mainly the mud protection performance for preventing muddy water from getting inside the bearing).

In other words, from the results of tests performed by the inventors, it was found that as long as the seal rings had at least two or three seal lips, it is possible to determine the adequacy of the seal performance according to the size of the total rotation resistance of both seal rings regardless of the construction of the seal rings, including the shape and material of the seal rings. Of course, it is important from the aspect of maintaining the seal performance of seal rings with a small rotation resistance that the difference in rotation resistance between the pair of seal rings be small. From this aspect, even for seal rings having a low rotation resistance, it is necessary to maintain a rotation resistance of at least 0.03 N·m. It was found that the necessary seal performance could be obtained when the rotation resistance of the seal rings having lower rotation resistance is maintained at least 0.03 N·m, and when the total rotation resistance of the pair of seal rings is at least 0.06 N·m.

From this, in the case of the rolling-bearing unit for wheel support of this invention in which the total rotation resistance of the pair of seal rings is 0.06 N·m to 0.4 N·m, it was found that it is possible to maintain the necessary seal performance and to sufficiently reduce the rotation torque.

BEST EMBODIMENTS TO WORK THE INVENTION

First, two embodiments of the construction of the rolling-bearing unit for wheel support to which this invention is applied is explained. This invention can be applied to the construction shown in FIGS. 10 and 11 described above, and in these two embodiments described below, the invention is applied to a rolling-bearing unit for supporting the driven wheels (rear wheels for a FR automobile, front wheels for a FF automobile, and all wheels for a 4WD automobile). This invention has particular importance for a rolling-bearing unit for driven-wheel support. The reason for this is that in the case of the non-driven wheels (front wheels for a FR automobile, rear wheels for a FF automobile) as shown in FIGS. 10 to 11, the seal rings (16a, 16d) on one side are done away with due to covering the opening on one end of the race located around the outer diameter side (hub 7 in the case of FIG. 10 and outer race 19 in the case of FIG. 11) with a cap 17 (see FIG. 10), and sliding resistance occurs for only one seal ring, however, in the case of a rolling-bearing unit for driven-wheel support, two seal rings are necessary.

Figure 1:
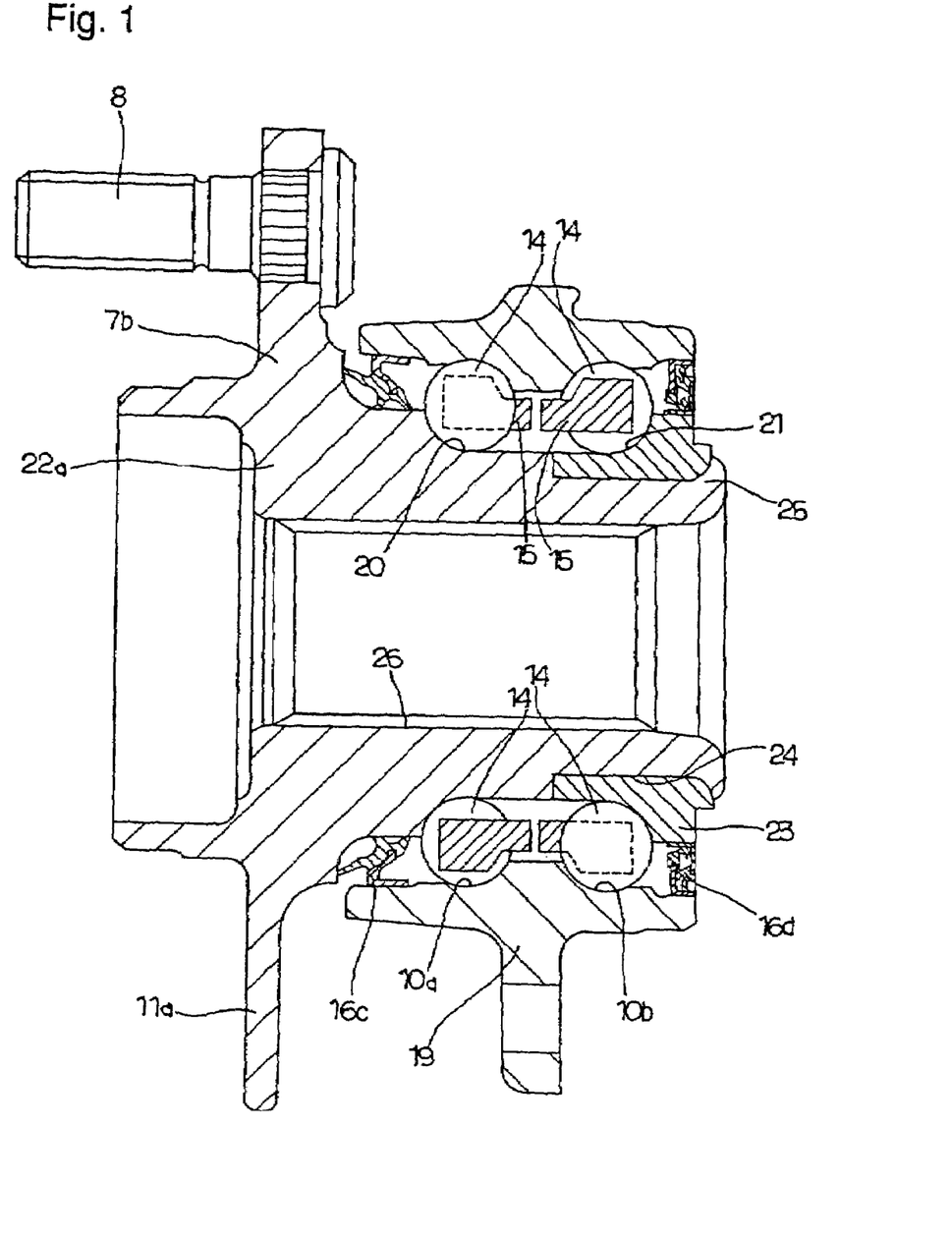
FIG. 1 is a cross-sectional drawing of a first embodiment of the construction to which this invention is applied.

First, the first embodiment shown in FIG. 1 is similar to the construction shown in FIG. 11 in that it rotatably supports the rotating race or hub 7b on this inner-diameter side of the stationary race or outer race 19 by the plurality of rolling bodies or balls 14, 14. A spline hole 26 for inserting the spline shaft (not shown in the figure) of the constant-velocity joint is formed in the center section of the hub member 22a of the hub 7b. Also, an inner race 23 fits around the small-diameter stepped section 24 that is formed on the inside end of the hub member 22a, and the surface on the inside end of the inner race 23 is held in place by a crimped section 25 that is formed by plastically deforming the inside end of the hub member 22a, so as to fasten the inner race 23 to the hub member 22a to form the hub 7b. Moreover, seal rings 16c, 16d are located between the inner peripheral surface of both ends of the outer race 9 and the outer peripheral surface in the middle section of the hub member 22a and the outer peripheral surface of the inside end of the inner race 23, and they seal off the space between the inner peripheral surface of the outer race 19 and the outer peripheral surface of the hub 7b, where the balls 14, 14 are located, from the outside space.

In this embodiment, the total rotation resistance of both seal rings 16c, 16d is regulated to be within the range 0.06 to 0.4 N·m. Also, these seal rings 16c, 16d prevent foreign matter such as muddy water and the like from getting inside the space where the balls 14, 14 are located. The construction of the other parts is substantially the same as the construction shown in FIG. 11.

Figure 2:
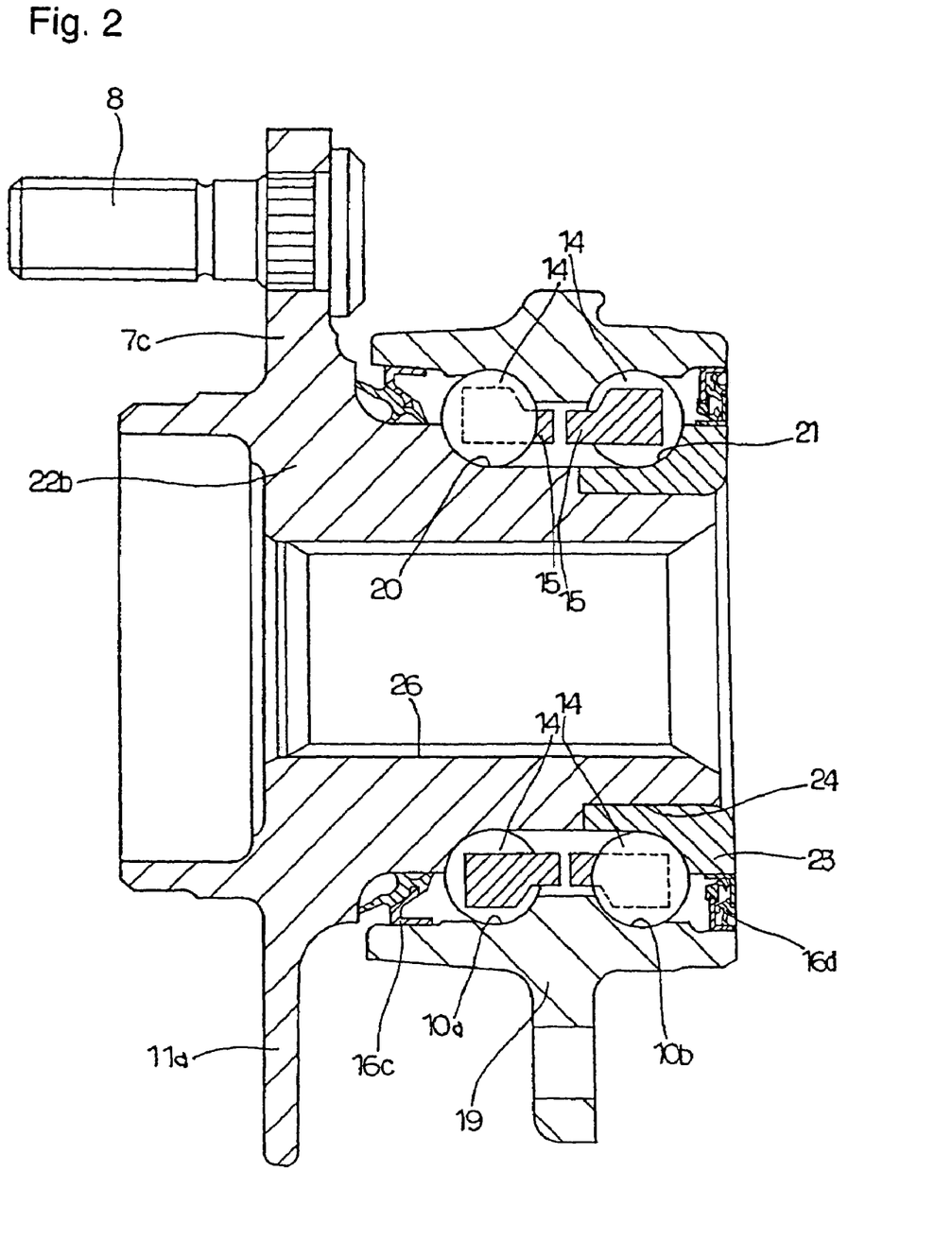
FIG. 2 is a cross-section drawing of a second embodiment of the construction to which this invention is applied.

Next, in the case of the second embodiment shown in FIG. 2, an inner race 23 fits around the small-diameter stepped section 24 formed on the inside end of the hub member 22b to form the hub 7c together with the hub member 22b, and the inside end of the inner race 23 protrudes inward further than the surface on the inside end of this hub member 22b. When installed in an automobile, the surface of the outside end of the constant-velocity joint (not shown in the figure) comes in contact with the surface on the inside end of the inner race 23, and prevents this inner race 23 from coming off of the small-diameter stepped section 24. The other construction is the same as in the first embodiment shown in FIG. 1 and described above.

Next, FIGS. 3 to 9 will be used to explain seven embodiments of the detailed construction of the seal rings applied in this invention. Of these, five of the embodiments shown in FIGS. 3 to 7 are construction of seal rings that can be used as inside seal rings 16b, 16d in the construction of the first and second embodiments of the rolling-bearing unit for wheel support shown in FIGS. 1 and 2, and in the construction shown in FIGS. 10 and 11 and explained previously. The explanation below explains the embodiment in which the construction shown in FIGS. 1 and 2 is applied.

Figure 3:
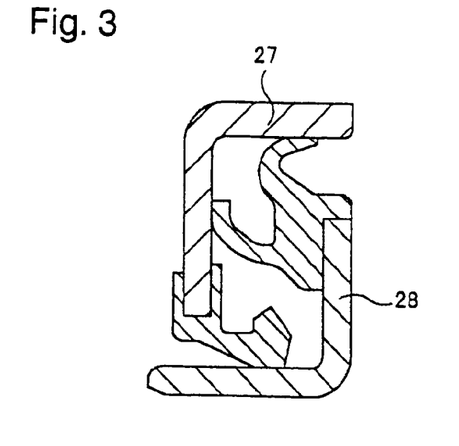
FIG. 3 is a cross-sectional drawing of first embodiment of the detailed construction of the seal ring applied to this invention.

First, the first embodiment shown in FIG. 3 is a combination seal ring that combines a radially-outer seal ring 27 that is fastened into the inside end of the outer race 19 (FIGS. 1 and 2) and a radially-inner seal ring 28 that is fastened onto the inside end of the inner race 5 (FIGS. 1 and 2), and comprises a total of three seal lips; two on the inner-diameter side and one on the outer-diameter side.

Figure 4:
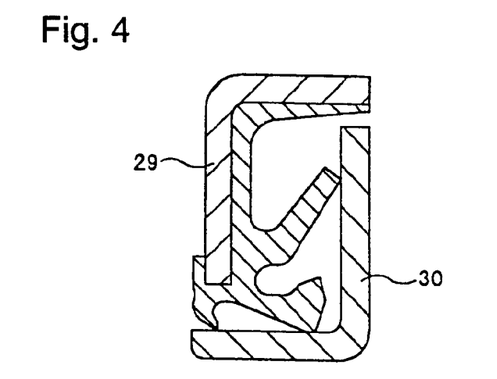
FIG. 4 is a partial cross-sectional drawing of a second embodiment of the detailed construction of the seal ring applied to this invention.

Next, the second embodiment shown in FIG. 4 is a combination seal ring that combines a seal ring 29 that fits into the inside end of the outer race 19 (FIGS. 1 and 2), and slinger 30 that fits onto the inside end of the inner race 5 (FIGS. 1 and 2), and comprises three seal lips on the seal ring 29.

Figure 5:
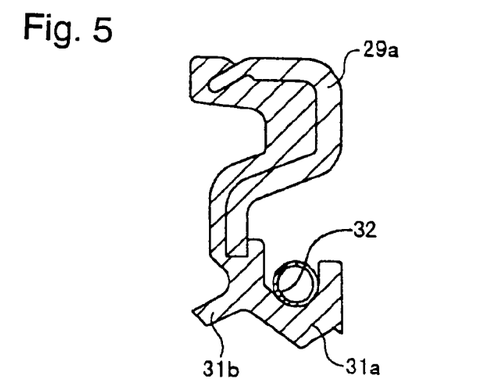
FIG. 5 is a partial cross-sectional drawing of a third embodiment of the detailed construction of the seal ring applied to this invention.

Next, the third embodiment shown in FIG. 5 is construction in which two seal lips 31a, 31b of the seal ring 29a fits into the inside end of the outer race 19 (FIGS. 1 and 2), and the inside seal lip 31a is slided on the outer peripheral surface of the inside end of the inner race 5 (FIGS. 1 and 2) with a garter spring 32.

Figure 6:
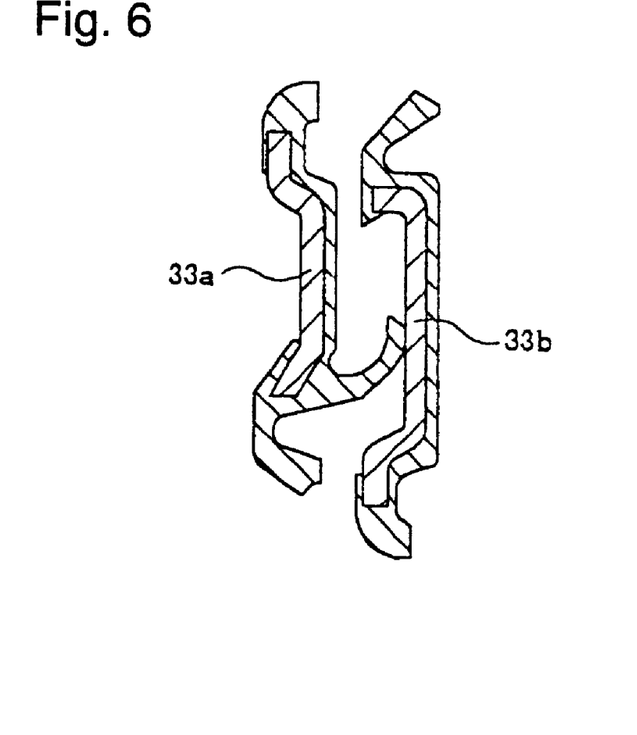
FIG. 6 is a partial cross-sectional drawing of a fourth embodiment of the detailed construction of the seal ring applied to this invention.

Next, the fourth embodiment shown in FIG. 6 is a combination seal ring that combines a seal ring 33a that is fastened to the inner peripheral surface on the inside end of the outer race 19 (FIGS. 1 and 2), and a seal ring 33b that fastens to the outer peripheral surface on the inside end of the inner race 5 (FIGS. 1 and 2). The seal rings of this embodiment comprise a total of three seal lips; two on the seal ring 33a that fastens to the side of the outer race 19, and one on the seal ring 33b that fastens to the side of the inner race 5.

Figure 7:
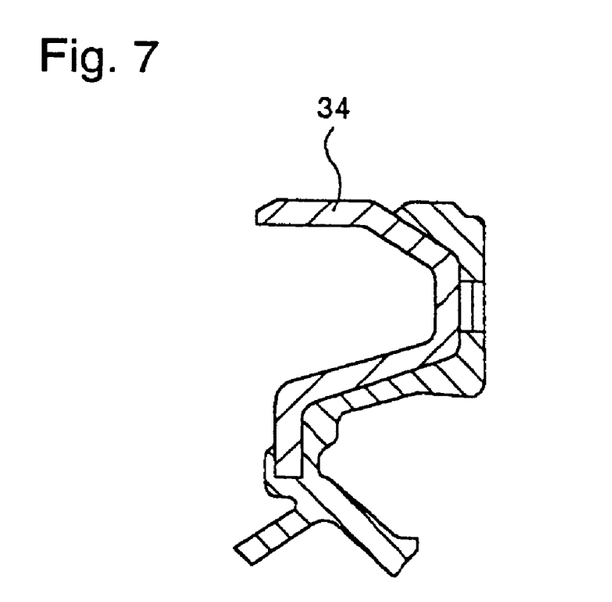
FIG. 7 is a partial cross-sectional drawing of a fifth embodiment of the detailed construction of the seal ring applied to this invention.

Next, FIG. 7 shows two seal lips are located on the seal ring 34 that fits around the inside on the inside end of the outer race 19, so that the tip edges of the two seal lips slide on the outer peripheral surface of the inside end of the inner race 5 (FIGS. 1 and 2).

Figure 8:
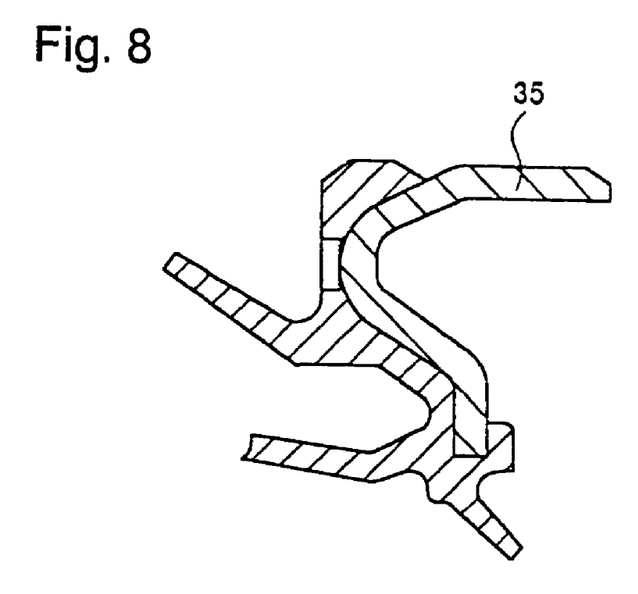
FIG. 8 is a partial cross-sectional drawing of a sixth embodiment of the detailed construction of the seal ring applied to this invention.
Figure 9:
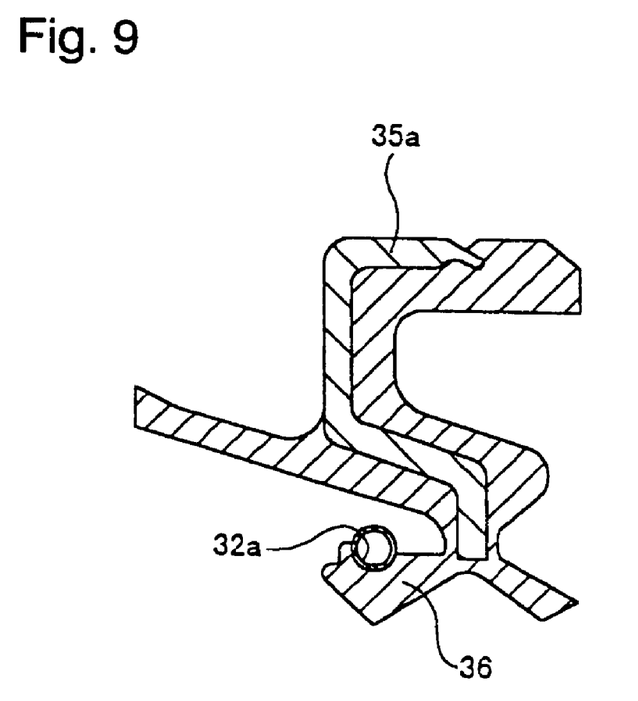
FIG. 9 is a partial cross-sectional drawing of a seventh embodiment of the detailed construction of the seal ring applied to this invention.

Next, the two embodiments shown in FIGS. 8 and 9 are of construction in which the seal rings can be used as seal rings located between the inner peripheral surface on the outside end of the outer race 19 (FIGS. 1 and 2) and the outer peripheral surface of the middle section of the hub member 22a, 22b (FIGS. 1 and 2).

First, the seal ring 35 of the first embodiment shown in FIG. 8 has three seal lips located around a metal core that freely fits into the outside end of the outer race 19, so that the tip edges of these seal lips freely slide over the inside surface of the installation flange 11a (FIGS. 1 and 2) or over the curved surface that connects this inside surface with the outer peripheral surface of the hub member 22a, 22b.

Next, in the case of the second embodiment shown in FIG. 9, the middle seal lip 36 of the three seal lips formed on the seal ring 35a is pressed against the outer peripheral surface of the middle section of the hub member 22a, 22b (FIGS. 22a, 22b) by way of the garter spring 32a.

A pair of seal rings is selected from among those shown in FIGS. 3 to 9 and installed between the inner peripheral surface of both ends of the outer race 19 of the rolling-bearing unit for wheel support, shown in FIGS. 1 and 3 and described above, and the outer peripheral surface of the middle section of the hub member 22a, 22b and the outer peripheral surface of the inside end of the inner race 23, so as to seal the openings on both ends of the space where the balls 14, 14 are located. Also, in the case of combining any of the seal rings, the total rotation resistance of both seal rings is regulated to within the range of 0.06 N·m to 0.4 N·m. Moreover, the rotation resistance of a seal ring having a lower rotation resistance must be kept at least 0.03 N·m.

Embodiments

Next, the results of tests performed to check the effect of the invention will be explained. In the tests, a pair of seal rings was selected from among the seven types of seal rings shown in FIGS. 3 to 9, and installed in the rolling-bearing for wheel support shown in FIG. 1 or FIG. 10, and the relationship between the total rotation resistance (seal torque) of both seal rings and the seal performance was found. Adjustment of the seal torque was performed by adjusting the interference of the seal lips (amount of elastic deformation), changing the elastic material, and adjusting the state of contact with the opposing surface. Also, twelve types of combinations of the seven kinds of seal rings were prepared, and 6 types were prepared for each total seal torque from 0.01 N·m to 0.10 N·m. Also, each of the seal rings was installed in the rolling-bearing unit for wheel support shown in FIG. 1 or FIG. 10, and mud protection was tested for them. The lubrication of the rolling-bearing unit for wheel support was performed using grease with a viscosity of 10 cSt to 14 cSt ($10 \times 10^{-6}$ m$^2$/s to $14 \times 10^{-6}$ m$^2$/s), and it was operated at 20° C. and the hub 7b (or 7) was rotated at 200 min$^{-1}$.

The results of the tests performed under these conditions are shown in Table 1.

TABLE 1

| Seal Torque (N·m) | ③+⑨ | ③+⑧ | ③+⑤ | ③+⑦ | ④+⑨ | ④+⑧ | ④+⑤ |
|---|---|---|---|---|---|---|---|
| 0.01 | X | X | X | X | X | X | X |
| 0.03 | O | O | X | X | Δ | Δ | X |
| 0.05 | O | O | Δ | Δ | O | O | Δ |
| 0.06 | O | O | O | O | O | O | O |
| 0.08 | O | O | O | O | O | O | O |
| 0.10 | O | O | O | O | O | O | O |

| (N·m) | ④+⑦ | ⑥+⑨ | ⑥+⑧ | ⑥+⑤ | ⑥+⑦ |
|---|---|---|---|---|---|
| 0.01 | X | X | X | X | X |
| 0.03 | X | X | X | X | X |
| 0.05 | Δ | Δ | Δ | X | X |
| 0.06 | O | O | O | O | O |
| 0.08 | O | O | O | O | O |
| 0.10 | O | O | O | O | O |

In Table 1, the circled numbers indicate the drawing numbers where the seal rings are shown. For example, ③ indicates the seal ring shown in FIG. 3, and ⑨ indicates the seal ring shown in FIG. 9. Also, ③+⑧ indicate a combination of the seal ring shown in FIG. 3 and the seal ring shown in FIG. 8. Moreover, the 'X' mark indicates that a large amount of muddy water entered into the internal space where the grease is located, the 'Δ' mark indicates that a small amount of muddy water entered, and the 'O' mark indicates that muddy water entering the space was not observed. From these test results, it is seen that when the seal torque is at least 0.2 N·m, it is possible to prevent muddy water from getting inside the bearing for any combination of the seal rings described above.

Next, tests that were performed in order to learn the effects that the seal torque (rotation resistance) has on the rotation torque of the overall rolling-bearing unit are explained. The tests were performed by installing the seal ring shown in FIG. 3 and the seal ring shown in FIG. 8 in the rolling-bearing unit for wheel support shown in FIG. 1. The seal torque was also changed in six steps from 0.1 N·m to 0.6 N·m, and the rotation torque of the hub 7b of the rolling-bearing unit for wheel support was observed. Lubrication of the rolling-bearing unit for wheel support was performed by filling the bearing with grease having a viscosity of 10 cSt to 14 cSt ($10 \times 10^{-6}$ m²/s to $14 \times 10^{-6}$ m²/s), and at a temperature of 20° C., the hub 7b was rotated at 200 rpm.

The test results under these conditions are shown in Table 2 below.

TABLE 2

| Seal Torque | Rotation Torque of Whole Rolling Bearing Unit |
|---|---|
| 0.1 N·m | light |
| 0.2 N·m | light |
| 0.3 N·m | light |
| 0.4 N·m | light |
| 0.5 N·m | slightly heavy |
| 0.6 N·m | heavy |

As can be clearly seen from Table 2 of the test results, when the seal torque becomes 0.5 N·m or greater, it becomes impossible to keep the rotation torque of the rolling-bearing unit for wheel support sufficiently low.

Industrial Applicability

The rolling-bearing unit for wheel support of this invention is constructed and functions as described above, and reduces the rotation torque of the hub that rotates with the wheel, and contributes to making it possible improve the driving performance of the automobile which centers on the acceleration performance and fuel consumption.

The invention claimed is:

1. A rolling bearing unit for wheel support comprising a stationary race, a rotating race, a plurality of rolling bodies and a pair of seal rings, the stationary race being adapted to be supported by and fastened to a suspension device when in use, the rotating race being adapted to support and fasten to a road wheel when in use, the rolling bodies being located between stationary raceways and the surface of rotating raceways that are formed on facing peripheral surfaces of the stationary race and rotating race, respectively, wherein the pair of seal rings seal off openings on both ends of a space between the opposing peripheral surfaces of the stationary race and rotating race where the rolling bodies are located, both seal rings having at least two seal lips made of an elastic material, wherein the rotation resistance of both seal rings due to the friction between the seal lips and the opposing surface is a total of from 0.06 N·m to 0.4 N·m.

2. The rolling bearing unit for wheel support of claim 1, wherein the stationary race is an outer race having an inner peripheral surface formed with a plurality of outer raceways which are arcuate in cross section, wherein the rotating race is a hub having an outer peripheral surface formed with a plurality of inner raceways which are arcuate in cross section, wherein the hub is a combination of a hub member and an inner race, wherein a mounting flange for vehicle wheel support is provided in the outer peripheral surface of the hub member at its outer end, wherein a first inner raceway is formed in an intermediate section of the hub member, wherein a small-diameter section having a smaller diameter than the portion where the first inner raceway is formed, at an intermediate portion closer to the inner end, where the inner ring fitted onto the small-diameter section has a second inner raceway on its outer peripheral surface, wherein the inner end face of the inner race is retained by a radially outwardly plastically deformed crimped portion which is the inner end of the hub member plastically, wherein the rolling bodies are balls, wherein the pair of seal rings are provided between the opening portions at both ends of the outer race and the outer peripheral surface at the intermediate portion of the hub member and the outer peripheral surface at the inner end of the inner race.

* * * * *